Sept. 15, 1964  B. L. JONES  3,148,745
NOISE ATTENUATION APPARATUS FOR LIQUID CONDUCTING CONDUITS
Filed May 23, 1962  2 Sheets-Sheet 1

INVENTOR
BERNICE L. JONES

BY *Shoemaker and Mattare*

ATTORNEYS

Sept. 15, 1964   B. L. JONES   3,148,745
NOISE ATTENUATION APPARATUS FOR LIQUID CONDUCTING CONDUITS
Filed May 23, 1962   2 Sheets-Sheet 2

INVENTOR
BERNICE L. JONES
BY Shoemaker and Mattare
ATTORNEYS

United States Patent Office 3,148,745
Patented Sept. 15, 1964

3,148,745
NOISE ATTENUATION APPARATUS FOR LIQUID
CONDUCTING CONDUITS
Bernice L. Jones, Newport News, Va., assignor to Newport News Shipbuilding and Dry Dock Company, Newport News, Va., a corporation of Virginia
Filed May 23, 1962, Ser. No. 197,139
12 Claims. (Cl. 181—48)

The present invention relates to a new and novel noise attenuation apparatus for liquid conducting conduits and more particularly to apparatus which is especially adapted for use with a liquid conducting conduit having pumping means associated therewith for forcing the liquid through the conduit.

There are many applications in which it is desirable to suppress a pump noise or other fluid pulsations in the conduits and pipes or tanks of a liquid supply or distribution system. In a typical example, it is very desirable to reduce the noise from pumps and the like in submarines to a minimum so as to reduce the possibility of the submarine's being detected by acoustic listening apparatus. It is additionally apparent that the reduction of noise in all types of ships is a desirable feature.

Accordingly, the present invention is particularly adapted for use on ships or other mobile vehicles wherein the supporting vehicle may be subjected to considerable rolling and pitching movements thereby drastically changing the orientation of the noise attenuation apparatus with respect to its normal operating position.

When utilizing noise attentuation apparatus as in a submarine or the like, the available space may be quite limited and accordingly, it is an additional feature of the present invention to provide a minimum dimension thereof while at the same time retaining a maximum of effectiveness in reducing noise.

A further important feature of the present invention is the provision of means for selectively tuning the apparatus so as to be effective over different frequency ranges whereby the device may accordingly be adjusted for an optimum range of operation with different sizes of pumps or other sources of noise.

It is important that the apparatus should not require excessive maintenance and accordingly, the present invention is specifically designed to minimize maintenance and the amount of operating attention required and further to provide a simple and inexpensive construction which is at the same time quite rugged and sturdy and reliable in operation.

In order to provide an arrangement whereby the apparatus is adapted to be effective even when the apparatus may be tilted at a considerable angle to its normal operating position, the structure of the present invention incorporates attenuation apparatus which is annular in configuration and which is disposed in surrounding relationship to the fluid conducting conduit. A plurality of openings are provided through the walls of the conduit to provide communication between the interior of the conduit and the attenuation means, these openings being spaced circumferentially as well as longitudinally with respect to the conduit and being substantially equally and uniformly spaced. With this arrangement, the forces transmitted by the liquid from the conduit to the attenuation means and vice versa will be substantially uniformly distributed about the stream of liquid flowing through the pipe and thereby maximum attenuation and efficiency is obtained. Additionally, pitching and rolling movements have a minimum deleterious effect with this symmetrical arrangement wherein the structure completely around the conduit is substantially symmetrical.

This annular chamber arrangement of the attenuation means also reduces the over-all outer peripheral dimensions of the arrangement. In order to reduce the longitudinal dimensions of the apparatus, tubular chamber defining means is provided which may extend substantially parallel with the axis of the conduit, these tubular chamber defining means serving to retain pockets of gas therein which act as resilient spring means for attenuating noises as is hereinafter more fully explained.

The tubular chamber defining means also serve to retain the gas pockets and to prevent the gas from escaping into the liquid conducting conduit even though the supporting vehicle may be subjected to rotary movement or various combinations of pitching and rolling movement which are commonly encountered in ships and the like.

The tubular chamber defining means additionally assist in increasing the attenuation of the apparatus since the effective mass of the pulsating slugs of liquid through the openings in the wall of the conducting conduit is increased and results in better low frequency attenuation without substantially affecting the effectiveness of the device at higher frequencies.

Means is provided for selectively adjusting the volume of the gas introduced into the various tubular chamber defining means, and by so changing the volume of the gas, the tuning of the chambers may be varied to provide optimum operation at different pulsating frequencies. It should be understood that the pressure of the gas into the various tubular chamber defining means may also be varied if desired, but in most instances a constant pressure will be employed while the change in volume is utilized for tuning the chambers.

The structural arrangement is such that there is practically no maintenance whatsoever since the only item which need be adjusted from time to time is the gas volume, this being accommodated by the simple expedient of the provision of a source of gas and manually operable valve means for controlling the flow of gas into the chambers.

An object of the present invention is to provide a new and novel noise attenuation apparatus which is especially adapted for use with liquid conducting conduits having pumping means or the like associated therewith.

Another object of the invention is the provision of noise attenuation apparatus which is particularly suited for use on ships and other mobile vehicles wherein rolling and pitching or rotary movements of the vehicle may cause major changes in the orientation of the apparatus relative to its normal operating position.

A further object of the invention is to provide noise attenuation apparatus which has a minimum size while retaining a maximum degree of effectiveness.

Still another object of the invention is the provision of noise attenuation apparatus which includes means for selectively tuning the apparatus so as to provide optimum operation at different pulsating frequencies.

A still further object of the invention is to provide noise attenuation apparatus which requires a minimum of maintenance and operating attention, which is simple and inexpensive in construction, and yet which is quite sturdy and reliable in operation.

Other objects and many attendant advantages of the invention will become more apparent when considered in connection with the specification and accompanying drawings, wherein.

Figure 1:
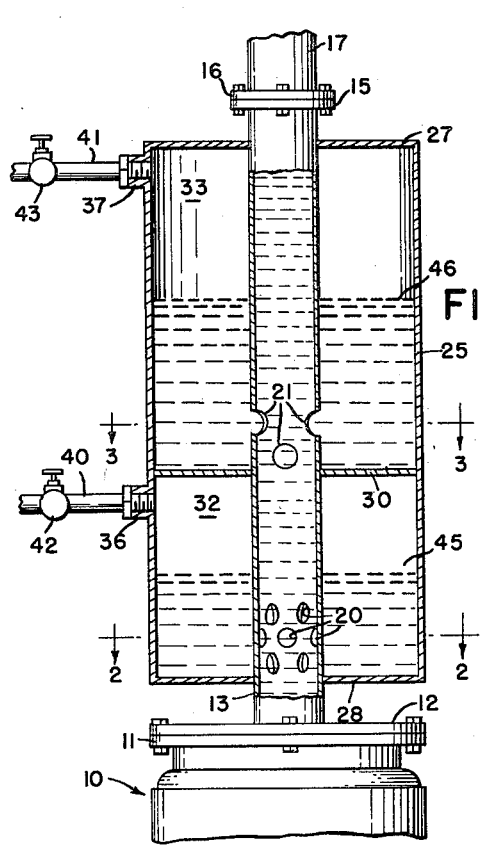
FIG. 1 is a longitudinal section through a first form of the invention illustrating the apparatus as connected in a liquid line having pump means associated therewith.
Figure 3:
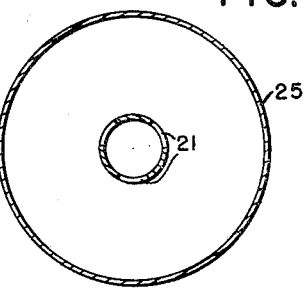
FIG. 3 is a cross-sectional view taken substantially along line 3—3 of FIG. 1 looking in the direction of the arrows.
Figure 2:
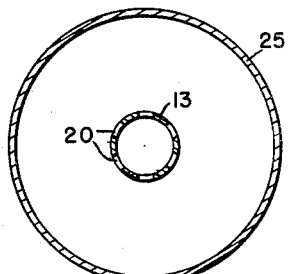
FIG. 2 is a cross-sectional view taken substantially along line 2—2 of FIG. 1 looking in the direction of the arrows.

Referring now to the drawings wherein like reference characters designate corresponding parts throughout the several views, and more particularly to FIGS. 1–3, a first modification of the invention is illustrated wherein a pump indicated generally by reference numeral 10 is indicated schematically, this pump including an attaching flange 11 which is bolted to an attaching flange 12 connected with a liquid conducting conduit 13 through which the liquid is normally pumped.

An attaching flange 15 at the upper end of conduit 13 is bolted to an attaching flange 16 on a conduit 17 through which the liquid is adapted to pass.

A first plurality of holes 20 are formed through the wall of conduit 13, and in a typical example there may be 45 of these holes each of which may have a diameter of approximately $23/32$ of an inch. These holes are spaced circumferentially about the conduit in a plurality of rows, the holes in each row being staggered with the holes in the adjacent row. The holes are spaced substantially uniformly both longitudinally and circumferentially about and along the conduit. With this arrangement, pulsations of the liquid through the holes will be substantially uniformly distributed so as to obtain the most efficient end result.

At a longitudinally spaced portion of the conduit a second plurality of holes 21 are provided, and in a typical example, there may be 6 openings at this portion of the conduit, each of the openings having a diameter of approximately $1 \, 43/64$ inches. These holes 21 are also spaced substantially uniformly both longitudinally and circumferentially about the conduit so as to obtain a uniform distribution of the pulsating forces active in the liquid.

A substantially cylindrical housing 25 is provided, this housing being generally symetrically disposed about conduit 13. The housing is provided with opposite end walls 27 and 28, these end walls fitting snugly about and being sealed with respect to conduit 13. In addition, an intermediate wall 30 which fits snugly about and is sealed with respect to the conduit 13 is provided so as to divide the interior of housing 25 into a lower chamber 32 and an upper chamber 33.

It will be noted that holes 20 provide communication between the interior of conduit 13 and the lower closed chamber 32 while holes 21 provide communication between the interior of the conduit and the interior of closed chamber 33, the holes in each case providing communication with one end portion of each of the chambers.

The opposite end portions of chambers 32 and 33 are provided with inlet fittings 36 and 37 respectively which are suitably threaded for receiving one end portion of pipes 40 and 41 respectively.

These pipes are connected with a suitable source of gas (not shown) and in a typical example may be connected with a compressor or an accumulator which is adapted to supply air under pressure to each of the pipes.

Manually selectively operable valves 42 and 43 are connected in pipes 40 and 41 for controlling the flow of gas therethrough. These valves are utilized for adjusting the volume of the gas in the upper portions of the two chambers 32 and 33 respectively as seen in FIG. 1.

During operation, when liquid is being pumped through conduit 13 by pump 10, liquid will normally be disposed in the lower portions of chambers 32 and 33 when the device is utilized in the vertical position as shown. The upper levels of the bodies of liquid in the two chambers are indicated by reference numerals 45 and 46 respectively.

It will be seen that in each case the body of liquid extends above the level of the holes in communication with the associated chamber so that the gas in the upper portion of the chambers will not escape through the holes in communication with the associated chamber. It will be understood that there is a pocket of gas in the upper portion of each of the chambers which serves as a spring means adapted to be compressed and to expand upon pulsations of the liquid within the associated chambers. By suitably adjusting the volume of the gas in each of the chambers, the apparatus may be effectively tuned so as to cause the device to have optimum efficiency at certain predetermined pulsating frequencies.

It is apparent that the two separate chambers 32 and 33 may be separately tuned to different frequencies. It will be well understood that the number and size of the holes and the wall thickness of the conduit, as well as the size of the chambers and the gas volume in the chambers are all factors which enter into the tuning of the apparatus, and these various parameters may be adjusted in accordance with well-known design characteristics so as to suitably tune the chambers.

The two chambers may be tuned so as to provide optimum efficiency over a relatively broad range of frequencies as will be well understood.

It will be noted that with the arrangement in FIG. 1, the outer dimension of the noise attenuation apparatus is maintained at a minimum and that the device is symmetrically disposed about the liquid conducting conduit. This symmetrical arrangement insures that the device will operate properly and efficiently even when the orientation of the device may be radically changed. That is to say, although the device as shown is intended to be operated in a vertical position, it is apparent that it can be tilted at a great angle with respect to vertical and still be fully operative. In fact, sufficient liquid may be provided in each of the chambers 32 and 33 such that the device will be operative also in a horizontal position, if necessary or desired.

Figure 4:
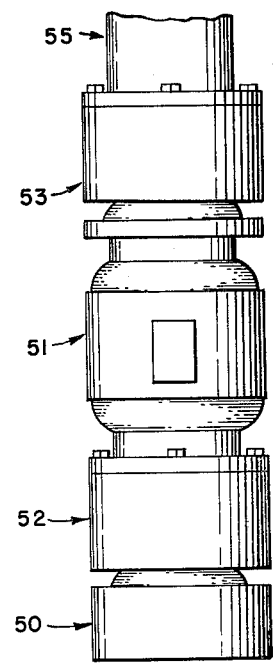
FIG. 4 is a somewhat schematic illustration of the manner in which a modified form of the apparatus of the present invention is adapted to be associated in a liquid line having pump means disposed therein.
Figure 7:
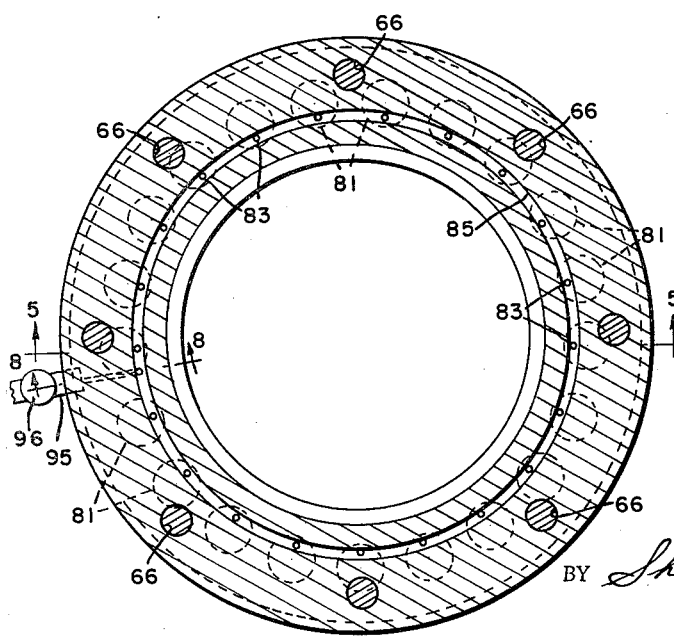
FIG. 7 is a cross-sectional view taken substantially along line 7—7 of FIG. 5 looking in the direction of the arrows.

Referring now to FIGS. 4–8, a second modification of the invention is illustrated. In FIG. 4, a sump is indicated generally by reference numeral 50, this sump providing a liquid supply for a liquid pump indicated generally by reference numeral 51. A noise attenuation device 52 according to the present invention is connected to the suction side of the pump as hereinafter more fully described.

A second noise attenuation apparatus 53 is illustrated as being connected with the outlet or pressure side of the pump and in turn is connected with an outlet conduit 55. It should be understood that the noise attenuation apparatus of the present invention can be provided either on the suction or pressure side of the pump or on both sides if such should be desirable.

Figure 6:
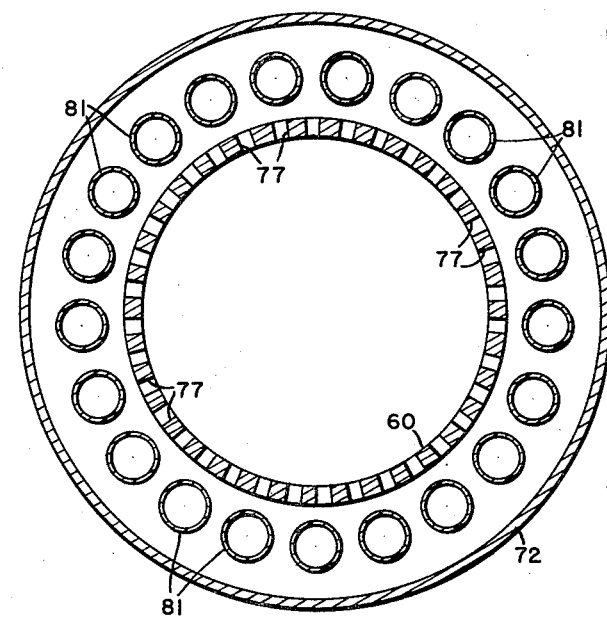
FIG. 6 is a cross-sectional view taken substantially along line 6—6 of FIG. 5 looking in the direction of the arrows.
Figure 8:
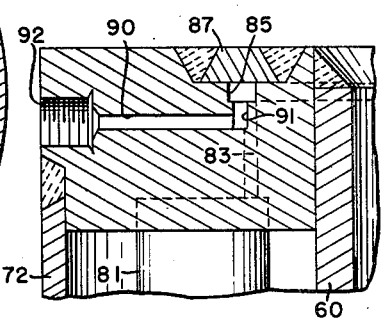
FIG. 8 is a longitudinal section on an enlarged scale taken substantially along line 8—8 of FIG. 7 looking in the direction of the arrows.
Figure 5:
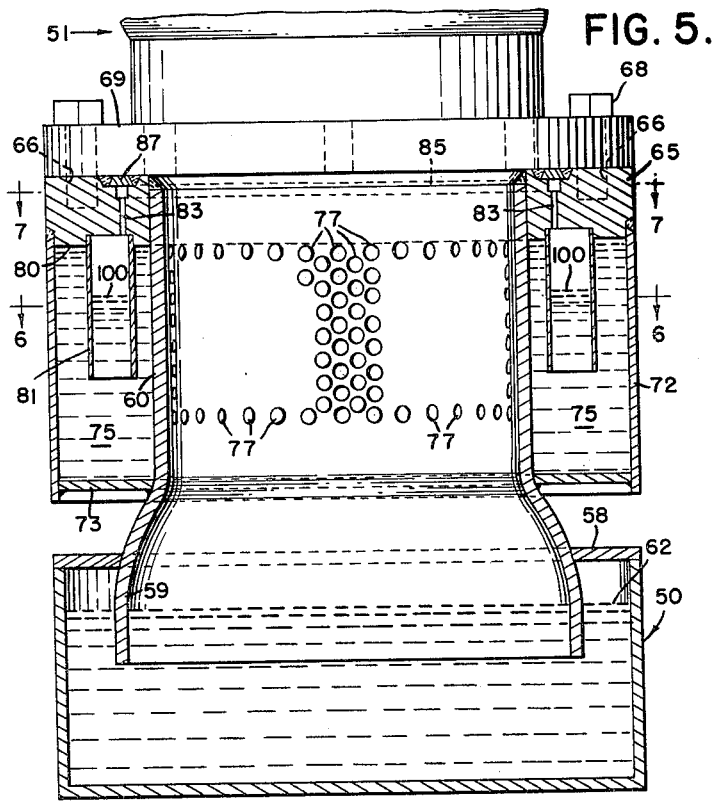
FIG. 5 is a longitudinal section taken substantially along line 5—5 of FIG. 7 looking in the direction of the arrows and illustrating the noise attenuation apparatus as illustrated in FIG. 4.

Referring particularly to FIGS. 5 and 6, it will be seen that sump 50 is provided with an upper wall 58 which receives the flared lower end 59 of a liquid conducting conduit 60. The sump is normally provided with a body of liquid 62 which serves to supply the pump with liquid in a well understood manner.

An annular flange 65 is suitably connected with the upper end of conduit 60 as by welding and the like, this flange having a plurality of threaded openings 66 formed in the upper surface thereof, these threaded openings being adapted to receive bolts 68 extending through suitable openings in the attaching flange 69 of pump 51 for securing the noise attenuation means to the pump.

A cylindrical plate 72 has the upper end thereof suitably secured as by welding to flange 65, plate 72 being disposed in spaced symmetrical relationship about conduit 60.

An annular bottom plate 73 has the outer periphery thereof secured as by welding to the inner surface of cylindrical plate 72, the inner perpihery of bottom plate 73 being secured as by welding to the outer surface of conduit 60.

It is apparent that members 65, 72 and 73 serve to define an annular cavity 75 disposed about conduit 60. Conduit 60 is provided with a plurality of holes 77 which provide communication between the interior of the conduit and the interior of the closed cavity 75. In a typical example, conduit 60 may be provided with 15 longitudinally spaced rows of holes, each row including 35 circumferentially spaced holes approximately 11/32 of an inch in diameter.

The bottom surface 80 of flange 65 is provided with a plurality of angularly spaced cylindrical indentations, each of which receives the upper end of an elongated tubular member 81, there being provided in the present case 21 of these tubular members. Each of these tubular members may be suitably secured in position as by silver brazing or the like, in a typical example the tubular members being formed of copper while the flange is formed of steel.

It will be noted that each of the tubular members is open at the opposite ends thereof, the lower ends of the tubular members as seen in the drawing being in communication with cavity 75. The open upper ends of each of the tubular members are in communication with vertically extending passages 83 provided in flange 65, the upper ends of each of these passages 83 being in communication with an annular manifold passage 85, passage 85 thereby serving to provide communication between the interior of all of the tubular members 81.

An annular ring 87 is welded in place so as to seal off the upper portion of manifold passage 85 after the passage and holes 83 have been suitably formed. As seen particularly in FIGS. 7 and 8, a laterally extending passage 90 is provided in flange member 65, the end portion 91 of this passage curving upwardly and opening into the lower portion of manifold passage 85. The outer end of passage 90 is in communication with an enlarged threaded portion 92 which is adapted to receive a correspondingly threaded end of a supply pipe 95. Supply pipe 95 is connected with a suitable source of gas as were the pipes 40 and 41 previously discussed. A valve 96 is connected in pipe 95 for selectively manually controlling the flow of gas into the manifold passage 85 and thence into the various tubular members 81. In this manner, the apparatus as shown in FIGS. 4-8 may also be selectively tuned for optimum efficiency.

It will be understood that the construction of the noise attenuation apparatus 53 is substantially identical with that of apparatus 52. It is apparent that each of tubular members 81 defines a separate chamber which during operation as shown will normally have a body of liquid disposed in the lower position thereof, the upper surface of the liquid in these chambers being indicated by reference numerals 100.

A pocket of gas is accordingly disposed in the upper portions of each of these chambers. When the apparatus is utilized on the suction side of the pump, the gas in the upper portions of the chambers defined by members 81 may be at atmospheric pressure, whereas when the noise attenuation apparatus is disposed on the pressure or discharge side of the pump, the gas within each of these chambers defined by the tubular members will normally be at a higher pressure.

As in the previous modification, the device may be tuned over a broad frequency range by suitable combinations of the number and size of the holes through the conduit, the thickness of the conduit, the diameter and number of tubular members 81 employed, and the volume of the gas within each of the chambers. When the tubular members are all interconnected with one another as shown, the various chambers will all be tuned to the same frequency. On the other hand, if it is desired to tune the device over a wide frequency range, the tubular members 81 may be made of different lengths and diameters, and means may be provided for separately controlling the gas volume in each of the members.

It will be noted that the arrangement of the tubular members as shown permits the holes 77 to be formed in the conduit 60 above the lower ends of the tubular members 81, thereby minimizing the required length of the apparatus. The arrangement of the tubular members 81 as shown permits the orientation of the apparatus to be drastically changed with respect to its normal vertical operating position as shown while the device will remain fully operative. This, of course, permits considerable rotation, rolling and pitching movements of the vehicle within which the device is utilized.

These tubular members also accomplish more than just defining the chambers as described above. They also effectively enter into the determination of the effective mass of the liquid pulsating through the holes 77 from the interior of the conduit 60 into cavity 75. The chambers defined by the tabular members 81 are located substantially more than a radius of one of the holes 77 away from the mouth of the hole. The effective mass is normally taken to include a cylinder equal to the length of the hole plus an additional length determined by properties of the physical termination of the hole.

The tubular members accordingly increase the attenuation of the device and increase the range of frequencies for this increased attenuation as a result of the complex effect whereby the effective mass of the pulsating slugs of liquid is increased thereby resulting in better low frequency attenuation without substantially affecting the effectiveness at higher frequencies.

It is apparent from the foregoing that there is provided new and novel noise attenuation apparatus which is especially adapted for use with liquid conducting conduits having pumping means or the like associated therewith. The apparatus is adapted to be connected flush up against a pump attaching flange and is provided with a minimum size so as to fit within normal installations which may be rather cramped such as on a ship and the like, and at the same time to retain a maximum degree of effectiveness. The apparatus is especially adapted for use with mobile vehicles which are subjected to considerable rotation, rolling and pitching movements which cause major changes in the operating position of the apparatus.

While the embodiments shown are primarily designed to be operated in a vertical position as shown in the drawings, the arrangements are such that, as pointed out above, the apparatus is adapted to efficiently operate even when tilted to extreme degrees from the vertical.

Means is provided for selectively adjusting the gas in the closed chambers of the apparatus, so as to selectively tune the chambers to different frequencies thereby providing maximum versatility.

It will also be apparent that as a practical matter, the only maintenance and operation attention which must be given to the apparatus is to adjust and maintain the gas pressure at a desired operating level. In addition, it is evident that the structure is quite simple and inexpensive in construction and at the same time is very sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Noise attenuation apparatus for liquid conducting conduits comprising a liquid conducting conduit, attenuation means disposed adjacent said conduit, means providing continuous communication between the interior of said conduit and said attenuation means, said attenuation means including means defining a plurality of separate chambers, compressible means including a quantity of gas filling a portion of each of said chambers, and means for selectively adjusting the volume of said compressible means.

2. Noise attenuation apparatus for liquid conducting conduits comprising a liquid conducting conduit, attenuation means disposed about said conduit, said conduit having a plurality of openings formed therethrough and providing continuous communication between the interior of said conduit and said attenuation means, said openings being spaced substantially uniformly both longitudinally and circumferentially about and along said conduit to provide a symmetrical arrangement of openings for uniformly distributing forces from the liquid in said conduit to the attenuation means, said attenuation means including means defining a plurality of separate chambers, each of said chambers having gas disposed in a portion thereof, and means for adjusting the volume of said gas within each of said chambers.

3. Noise attenuation apparatus for liquid conducting conduits comprising a liquid conducting conduit, attenuation means disposed in surrounding relationship to said conduit, said conduit having a plurality of openings formed therethrough and providing continuous communication between the interior of said conduit and said attenuation means, said openings being spaced both substantially uniformly both longitudinally and circumferentially about and along said conduit to provide a symmetrical arrangement of openings for uniformly distributing forces from the liquid in said conduit to the attenuation means, said attenuation means including tubular means defining a plurality of separate chambers, said chambers being normally partially filled during operation with liquid from said conduit, the remaining portion of said chambers being filled with gas in direct contact with the surface of said liquid in the chambers, and means in communication with the remaining portions of said chambers for selectively adjusting the volume of said gas to tune each of said chambers.

4. Noise attenuation apparatus for liquid conducting conduits comprising a liquid conducting conduit, attenuation means disposed in surrounding relationship to said conduit, first continuously open opening means formed through said conduit at one portion thereof, second continuously open opening means formed through said conduit at a longitudinally spaced portion of the conduit, said attenuation means defining a first closed annular completely unobstructed chamber surrounding that portion of said conduit having said first opening means formed therethrough, said attenuation means also including a second annular completely unobstructed closed chamber disposed in surrounding relationship to that portion of the conduit through which said second opening means is formed, means disposed in communication with the interior of each of said chambers for introducing gas into said chambers, and means for selectively adjusting the gas volume within each of said chambers for tuning each chamber.

5. Apparatus as defined in claim 4, wherein said first opening means comprises a plurality of spaced openings, said openings being substantially uniformly spaced from one another and being spaced both circumferentially and longitudinally relative to said conduit to provide a symmetrical arrangement of openings for uniformly distributing forces from the liquid in said conduit to the attenuation means.

6. Apparatus as defined in claim 4, wherein said means for introducing gas into each of said chambers comprises a separate inlet into each of said chambers, said inlets being disposed adjacent one end of said chambers and the first and second opening means being disposed adjacent the opposite ends of the respective chambers whereby during operation liquid is normally disposed within that portion of the chambers adjacent said opening means and gas is normally disposed within that portion of the chambers adjacent said inlet and in direct contact with the surface of the liquid in the associated chambers.

7. Noise attenuation apparatus for liquid conducting conduits comprising a liquid conducting conduit, said conduit having a first plurality of circumferentially and horizontally spaced continuously open openings formed therethrough, said conduit having a second plurality of horizontally and circumferentially spaced continuously open openings formed therethrough, said second plurality of openings being spaced a substantial distance longitudinally of said first plurality of openings, attenuation means disposed in surrounding relationship to said conduit and comprising a cylindrical body means closed at opposite ends thereof and sealed with respect to said conduit, said body means including a transversely extending wall dividing the interior thereof into a pair of separate closed chambers, said first plurality of openings providing continuous communication between the interior of said conduit and a first one of said chambers, said second plurality of openings providing continuous communication between the interior of said conduit and a second one of said chambers, the first and second plurality of openings being disposed in communication with one end portion of the respective chambers, an inlet fitting disposed in communication with the opposite end portion of each of the respective chambers, said inlet fitting being adapted to be connected with a source of gas for introducing gas into said chambers, and means for separately and individually controlling the gas volume in each of said chambers.

8. Noise attenuation apparatus for liquid conducting conduits comprising a liquid conducting conduit, body means defining an enclosed annular cavity disposed in surrounding relationship to a portion of said conduit, a plurality of spaced openings formed through said conduit and providing continuous communication between the interior of said conduit and the interior of said cavity, means defining a plurality of separate chambers disposed within said cavity, each of said chamber defining means opening at one end portion thereof into said cavity and being at least partially filled with liquid from said conduit, means for introducing gas into a portion of each of said chamber defining means with the gas in direct contact with the surface of the liquid within each of said chamber defining means, and means for controlling the volume of the gas within said chamber defining means.

9. Noise attenuation apparatus for liquid conducting conduits comprising a liquid conducting conduit, body means defining an enclosed annular cavity disposed in surrounding relationship to a portion of said conduit, a plurality of spaced openings formed through said conduit and providing communication between the interior of said conduit and the interior of said cavity, a plurality of tubular members disposed within said cavity and defining a plurality of separate chambers, one end of each of said tubular members opening into said cavity, the opposite ends of said tubular members being supported by said body means, said body means including means for introducing gas into the adjacent end portion of each of said tubular members, and means for selectively adjusting the volume of the gas introduced into each of said tubular members.

10. Apparatus as defined in claim 9, wherein said tubular members are spaced circumferentially about said conduit, said openings formed through said conduit also being spaced circumferentially about said conduit, and said tubular members extending substantially parallel with said conduit.

11. Apparatus as defined in claim 9, wherein each of said tubular members is spaced from said conduit and spaced outwardly from the outer wall of said conduit, said body means including an outer wall disposed in spaced surrounding relationship to said tubular members.

12. Apparatus as defined in claim 9, wherein said means in said body means for introducing gas into said tubular members comprises a manifold passage which provides communication between all of said tubular members.

References Cited in the file of this patent

UNITED STATES PATENTS

| | | |
|---|---|---|
| 696,277 | Sponseller et al. | Mar. 25, 1902 |
| 1,342,491 | York | June 8, 1920 |
| 1,856,695 | De Florez | May 3, 1932 |
| 1,874,326 | Mason | Aug. 30, 1932 |
| 2,056,076 | Le Blanc | Sept. 29, 1936 |
| 2,548,472 | Gibson | Apr. 10, 1951 |
| 3,061,039 | Peters | Oct. 30, 1962 |